(12) United States Patent
Das et al.

(10) Patent No.: US 10,073,885 B2
(45) Date of Patent: Sep. 11, 2018

(54) OPTIMIZER STATISTICS AND COST MODEL FOR IN-MEMORY TABLES

(71) Applicant: Oracle International Corporation, Redwood Shores, CA (US)

(72) Inventors: Dinesh Das, Redwood City, CA (US); Jiaqi Yan, San Carlos, CA (US); Jesse Kamp, Castro Valley, CA (US); Prashant Gaharwar, San Mateo, CA (US); Satyanarayana R. Valluri, Batiment (CH)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 396 days.

(21) Appl. No.: 14/806,597

(22) Filed: Jul. 22, 2015

(65) Prior Publication Data

US 2016/0350371 A1 Dec. 1, 2016

Related U.S. Application Data

(60) Provisional application No. 62/168,050, filed on May 29, 2015.

(51) Int. Cl.
*G06F 17/30* (2006.01)
*G06F 12/02* (2006.01)

(52) U.S. Cl.
CPC ...... *G06F 17/30463* (2013.01); *G06F 12/023* (2013.01); *G06F 17/30339* (2013.01);
(Continued)

(58) Field of Classification Search
CPC ......... G06F 17/30463; G06F 17/30477; G06F 17/30339; G06F 17/30371;
(Continued)

(56) References Cited

U.S. PATENT DOCUMENTS

| 4,782,325 A | 11/1988 | Jeppsson et al. |
|---|---|---|
| RE34,052 E | 9/1992 | Hester et al. |

(Continued)

FOREIGN PATENT DOCUMENTS

| EP | 1 111 500 A1 | 3/1996 |
|---|---|---|
| EP | 2 040 180 A1 | 3/2009 |

(Continued)

OTHER PUBLICATIONS

U.S. Appl. No. 14/337,179, filed 07/21/2014, Notice of Allowance, dated Jul. 29, 2015.

(Continued)

*Primary Examiner* — Anh Ly
(74) *Attorney, Agent, or Firm* — Hickman Palermo Becker Bingham LLP

(57) ABSTRACT

Techniques are provided for determining costs for alternative execution plans for a query, where at least a portion of the data items required by the query are in in-memory compression-units within volatile memory. The techniques involve maintaining in-memory statistics, such as statistics that indicate what fraction of a table is currently present in in-memory compression units, and the cost of decompressing in-memory compression units. Those statistics are used to determine, for example, the cost of a table scan that retrieves some or all of the necessary data items from the in-memory compression-units.

24 Claims, 5 Drawing Sheets

(52) U.S. Cl.
CPC .. *G06F 17/30371* (2013.01); *G06F 17/30466* (2013.01); *G06F 17/30477* (2013.01); *G06F 17/30498* (2013.01); *G06F 17/30569* (2013.01); *G06F 2212/1044* (2013.01)

(58) Field of Classification Search
CPC ......... G06F 17/30498; G06F 17/30569; G06F 17/30466; G06F 17/30528; G06F 17/30545; G06F 17/30; G06F 17/30584; G06F 12/023; G06F 2212/1044
See application file for complete search history.

(56) References Cited

U.S. PATENT DOCUMENTS

| | | | |
|---|---|---|---|
| 5,423,010 | A | 6/1995 | Mizukami |
| 5,581,705 | A | 12/1996 | Passint et al. |
| 5,617,567 | A | 4/1997 | Doktor |
| 5,742,792 | A | 4/1998 | Yanai et al. |
| 5,778,430 | A | 7/1998 | Ish et al. |
| 5,826,259 | A | 10/1998 | Doktor |
| 5,870,759 | A | 2/1999 | Bauer et al. |
| 6,009,432 | A | 12/1999 | Tarin |
| 6,047,081 | A | 4/2000 | Groezinger et al. |
| 6,317,824 | B1 | 11/2001 | Thakkar et al. |
| 6,609,131 | B1 | 8/2003 | Zait |
| 6,671,797 | B1 | 12/2003 | Golston |
| 6,745,174 | B2 | 6/2004 | Levy et al. |
| 6,826,522 | B1 | 11/2004 | Moller et al. |
| 6,842,848 | B2 | 1/2005 | Hokenek et al. |
| 6,954,776 | B1 | 10/2005 | Cruanes |
| 7,020,661 | B1 | 3/2006 | Cruanes |
| 7,047,252 | B2 | 5/2006 | Buch et al. |
| 7,149,769 | B2 | 12/2006 | Lubbers et al. |
| 7,725,595 | B1 | 5/2010 | Geissler et al. |
| 7,769,726 | B2 | 8/2010 | Faerber et al. |
| 7,861,060 | B1 | 12/2010 | Nickolls et al. |
| 7,991,794 | B2 | 8/2011 | Bedi et al. |
| 8,049,760 | B2 | 11/2011 | Jio et al. |
| 8,126,855 | B2 | 2/2012 | Faerber et al. |
| 8,244,780 | B1 | 8/2012 | Narayanan |
| 8,260,803 | B2 | 9/2012 | Hsu et al. |
| 8,285,709 | B2 | 10/2012 | Candea et al. |
| 8,326,810 | B2 | 12/2012 | Faerber et al. |
| 8,433,684 | B2 | 4/2013 | Munoz |
| 8,521,788 | B2 | 8/2013 | Ellison et al. |
| 8,533,216 | B2 | 9/2013 | Buger et al. |
| 8,543,534 | B2 | 9/2013 | Alves et al. |
| 8,572,131 | B2 | 10/2013 | Ellison et al. |
| 8,725,707 | B2 | 5/2014 | Chen et al. |
| 8,856,484 | B2 | 10/2014 | Ben-Tsion et al. |
| 8,938,644 | B2 | 1/2015 | Clark et al. |
| 8,996,463 | B2 | 3/2015 | Merriman et al. |
| 9,292,564 | B2 | 3/2016 | Kamp et al. |
| 9,600,500 | B1 * | 3/2017 | Gupta ............... G06F 17/30289 707/638 |
| 2002/0184392 | A1 | 12/2002 | Pathasarathy et al. |
| 2002/0188830 | A1 | 12/2002 | Boles et al. |
| 2002/0194157 | A1 | 12/2002 | Zait |
| 2005/0055380 | A1 | 3/2005 | Thompson et al. |
| 2005/0131879 | A1 | 6/2005 | Ghosh |
| 2005/0177706 | A1 | 8/2005 | Lee |
| 2006/0173833 | A1 | 8/2006 | Purcell et al. |
| 2006/0200507 | A1 * | 9/2006 | Holenstein .......... G06F 11/2048 707/E17.005 |
| 2006/0218194 | A1 | 9/2006 | Yalamanchi |
| 2007/0050328 | A1 * | 3/2007 | Li ..................... G06F 17/30967 707/E17.136 |
| 2007/0203925 | A1 | 8/2007 | Sandler et al. |
| 2007/0208695 | A1 * | 9/2007 | Burger ............... G06F 17/30483 707/E17.044 |
| 2008/0033914 | A1 * | 2/2008 | Cherniack ........... G06F 17/30457 707/E17.014 |
| 2008/0046686 | A1 | 2/2008 | Cameron |
| 2008/0059492 | A1 | 3/2008 | Tarin |
| 2008/0086480 | A1 | 4/2008 | Srivastava |
| 2008/0086495 | A1 | 4/2008 | Kizitunc |
| 2008/0256250 | A1 | 10/2008 | Wakefield et al. |
| 2008/0281784 | A1 | 11/2008 | Zane et al. |
| 2008/0281865 | A1 | 11/2008 | Price et al. |
| 2008/0294863 | A1 | 11/2008 | Faerber et al. |
| 2009/0037700 | A1 | 2/2009 | Graham |
| 2009/0100089 | A1 | 4/2009 | Eadon |
| 2009/0119247 | A1 | 5/2009 | Bellamkonda |
| 2009/0254522 | A1 * | 10/2009 | Chaudhuri ......... G06F 17/30306 707/E17.014 |
| 2009/0307290 | A1 | 12/2009 | Barsness et al. |
| 2010/0030796 | A1 | 2/2010 | Netz et al. |
| 2010/0088309 | A1 | 4/2010 | Petculescu et al. |
| 2010/0235335 | A1 | 9/2010 | Heman et al. |
| 2010/0235347 | A1 | 9/2010 | Chaudhuri |
| 2010/0250549 | A1 | 9/2010 | Muller et al. |
| 2010/0278446 | A1 | 11/2010 | Ganesh et al. |
| 2010/0299316 | A1 | 11/2010 | Faerber et al. |
| 2011/0029557 | A1 | 2/2011 | Raghavan et al. |
| 2011/0029569 | A1 | 2/2011 | Ganesh et al. |
| 2011/0047144 | A1 | 2/2011 | Han |
| 2011/0119249 | A1 | 5/2011 | Flatz |
| 2011/0137890 | A1 | 6/2011 | Bestgen |
| 2011/0138123 | A1 * | 6/2011 | Gurajada .......... G06F 17/30595 711/118 |
| 2011/0225123 | A1 * | 9/2011 | D'Souza ........... G06F 17/30312 707/634 |
| 2012/0047158 | A1 * | 2/2012 | Lee ................... G06F 17/30469 707/759 |
| 2012/0054225 | A1 | 2/2012 | Marwah et al. |
| 2012/0173515 | A1 | 7/2012 | Jeong et al. |
| 2012/0303633 | A1 | 11/2012 | He et al. |
| 2012/0310916 | A1 | 12/2012 | Abadi |
| 2012/0323971 | A1 * | 12/2012 | Pasupuleti ........ G06F 17/30306 707/802 |
| 2013/0151567 | A1 | 6/2013 | Ellison et al. |
| 2013/0151568 | A1 | 6/2013 | Ellison et al. |
| 2013/0159285 | A1 * | 6/2013 | Dees ................. G06F 17/30466 707/718 |
| 2013/0166588 | A1 * | 6/2013 | Gruschko ............... G06F 17/30 707/769 |
| 2013/0275473 | A1 | 10/2013 | Ellison et al. |
| 2014/0013076 | A1 | 1/2014 | Ganesh et al. |
| 2014/0013077 | A1 | 1/2014 | Ganesh et al. |
| 2014/0013078 | A1 | 1/2014 | Ganesh et al. |
| 2014/0040218 | A1 | 2/2014 | Kimura et al. |
| 2014/0067791 | A1 * | 3/2014 | Idicula .............. G06F 17/30457 707/714 |
| 2014/0075493 | A1 | 3/2014 | Krishnan et al. |
| 2014/0095748 | A1 | 4/2014 | Aingaran et al. |
| 2014/0096145 | A1 | 4/2014 | Aingaran et al. |
| 2014/0108378 | A1 * | 4/2014 | Alpers .............. G06F 17/30469 707/716 |
| 2014/0173702 | A1 * | 6/2014 | Wong ..................... H04L 63/10 726/4 |
| 2014/0279838 | A1 | 9/2014 | Tsirogiannis |
| 2014/0317159 | A1 | 10/2014 | Dhavale |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2015/0149704 | A1 * | 5/2015 | Lee ................... G06F 17/30368 711/103 |
| 2016/0034486 | A1 | 2/2016 | Dageville |
| 2016/0117375 | A1 * | 4/2016 | Antonopoulos .. G06F 17/30575 707/638 |
| 2016/0350347 | A1 | 12/2016 | Das et al. |
| 2016/0350375 | A1 | 12/2016 | Das et al. |

(56) References Cited

U.S. PATENT DOCUMENTS

2017/0193012 A1* 7/2017 Gupta ............... G06F 17/30283
                                                          707/802

FOREIGN PATENT DOCUMENTS

| EP | 2040180 A1 | 3/2009 |
|---|---|---|
| EP | 2423843 A1 | 2/2012 |
| EP | 2 608 070 A1 | 6/2013 |
| GB | 12 332 631 A | 10/1973 |
| JP | 2000261674 A | 9/2000 |
| WO | WO 00/08552 A1 | 2/2000 |
| WO | WO 2007/078444 A1 | 7/2007 |
| WO | WO 2010/039895 | 4/2010 |
| WO | WO 2013/095653 A1 | 6/2013 |
| WO | WO 2013/095662 A1 | 6/2013 |

OTHER PUBLICATIONS

U.S. Appl. No. 14/337,179, filed Jul. 21, 2014, Office Action, dated Dec. 29, 2014.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.
U.S. Appl. No. 13/916,284, filed Jun. 12, 2013, Office Action, dated Aug. 15, 2014.
U.S. Appl. No. 13/916,284, filed Jun. 12, 2013, Office Action, dated May 19, 2015.
U.S. Appl. No. 13/916,284, filed Jun. 12, 2013, Interview Summary, dated Jul. 2, 2015.
U.S. Appl. No. 13/916,284, filed Jun. 12, 2013, Interview Summary, dated Mar. 27, 2015.
U.S. Appl. No. 13/916,284, filed Jun. 12, 2013, Interview Summary, dated Feb. 11, 2015.
U.S. Appl. No. 13/916,284, filed Jun. 12, 2013, Final Office Action, dated Dec. 15, 2014.
U.S. Appl. No. 13/916,284, filed Jun. 12, 2013, Advisory Action, dated Mar. 10, 2015.
U.S. Appl. No. 14/337,179, filed Jul. 21, 2014, Notice of Allowance, dated Nov. 3, 2015.
U.S. Appl. No. 13/916,284, filed Jun. 12, 2013, Notice of Allowance, dated Jul. 27, 2015.
Park et al., "Polymorphic Pipeline Array: A Flexible Multicore Accelerator with Virtualized Execution for Mobile Multimedia Applications", Dated Dec. 12, 2009 11 pages.
"MonetDB", Wikipedia, available: http://en.wikipedia.org/wiki/MonetDB, May 16, 2012, 3 pages.
Brewer et al., "Remote Queues: Exposing Message Queues for Optimization and Atomicity", dated 1995 ACM, 12 pages.
CCCP: Accelerator Virtualization, http://cccp.eecs.umich.edu/research/virtual.php, printed on Jul. 4, 2012, 3 pages.
Claims from PCT Application No. PCT/US2012/068526, dated Mar. 2013, 3 pages.
Dynamic Scheduling Techniques, http://www.cs.iastate.edu/~prabhu/Tutorial/PIPELINE/dynamSchedTech.html, printed on Jul. 4, 2012, 2 pages.
Farber et al., "SAP HANA Database—Data Management for Modern Business Applications", SIGMOD Record, dated Dec. 2011, vol. 40, No. 4, 8 pages.
IBM, "Technical Disclosure Bulletin", Data Packing and Unpacking Scheme for High Performance Image Processing, vol. 36, No. 7, dated Jul. 1993, 6 pages.
Khalid Sayood:, "Introduction to data Compression", Morgan Kaufmann Publisher, dated Dec. 1996, 4 pages.
Nirmesh, Malviya, "Recovery Algorithms for In-Memory OLTP Databases", Master of Science Thesis, dated Jul. 1, 2012, 66 pages.
"Column Store features" monetdb, available: http://www.moneydb.org/Home/Features, 2008-2013, 3 pages.
Notification of Transmittal of the International Search Report and the Written Opinion of the International Searching Authority, PCT Application No. PCT/US2012/068531, dated Mar. 20, 2013, 11 pages.
Zukowski, M. "Vectorwise: Beyond Column Stores" ACTIAN 2012, 17 pages.
Phipps, Colin:, "Mapping Deflated Files", Internet Article, dated Jan. 6, 2013, http://zsync.moria.org.uk/paper/ch03s02.html, 3 pages.
Ramamurthy, Ravishankar, "A Case for Fractured Mirrors" Proceedings of the 28th VLDB Conference, dated, 2002, 12 pages.
Schaffner, et al., "A Hybrid Row-Column OITP Database Architecture for Operational Reporting", dated 2009, 14 pages.
Schmit et al., "PipeRench: A Virtualized Programmable Datapath in 0.18 Micron Technology", dated 2002, 4 pages.
Silva et al., "Using a Tighly-Coupled Pipeline in Dynamically Reconfigureable Platform FPGAs", dated May 2003, 4 pages.
Von Eicken et al., "Active Messages: A Mechanism for Integrated Communication and Computation", dated 1992, ACM, 12 pages.
W. Cockshott et al., "High-Performance Operations Using a Compressed Database Architecture", The Computer Journal, vol. 41, 1998, 14 pages.
Weinhardt, Markus, "Compilation and Pipeline Synthesis for Reconfigurable Architectures", 1997, 8 pages.
Wikipedia, "In Memory Database", Dated Jan. 30, 2013, 4 pages.
Wikipedia, "SIMD, Single Instruction Multiple Instruction", dated Jan. 1, 2013, 7 pages.
Notification of Transmittal of the International Search Report and the Written Opinion of the International Searching Authority, PCT Application No. PCT/US2012/068526, dated Mar. 20, 2013, 11 pages.
Das, U.S. Appl. No. 14/806,614, filed Jul. 22, 2015, Office Action, dated Dec. 6, 2017.
Das, U.S. Appl. No. 14/806,601, filed Jul. 22, 2015, Office Action, dated Nov. 3, 2017.
Das, U.S. Appl. No. 14/806,614, filed Jul. 22, 2015, Interview Summary, dated Jan. 17, 2018.

* cited by examiner

OPTIMIZER STATISTICS AND COST MODEL FOR IN-MEMORY TABLES

CROSS-REFERENCE TO RELATED APPLICATIONS; BENEFIT CLAIM

This application claims the benefit of U.S. Provisional Application No. 62/168,050, filed May 29, 2015, the entire contents of which is hereby incorporated by reference as if fully set forth herein, under 35 U.S.C. § 119(e).

This application is related to:
U.S. application Ser. No. 14/806,601, filed on Jul. 22, 2015, titled "OPTIMIZING EXECUTION PLANS FOR IN-MEMORY-AWARE JOINS"; and
U.S. application Ser. No. 14/806,614, filed on the Jul. 22, 2015, titled "TECHNIQUES FOR EVALUATING QUERY PREDICATES DURING IN-MEMORY TABLE SCANS".

The contents of both of which are incorporated herein by reference as if fully disclosed herein.

FIELD OF THE INVENTION

The present invention relates to collecting and managing in-memory statistics in a dual-format database system, and making use of those statistics when selecting execution plans for queries.

BACKGROUND

Traditional on-disk row-major tables have been the dominant storage mechanism in relational databases for decades. Over the last decade, however, with explosive growth in data volume and demand for faster analytics, has come the recognition that a different data representation is needed. There is widespread agreement that in-memory column-oriented databases are best suited to meet the realities of this new world.

U.S. patent application Ser. No. 14/337,170, filed Jul. 21, 2014, entitled "Mirroring, In Memory, Data From Disk To Improve Query Performance", (referred to hereafter as the "Mirroring Application") is incorporated herein in its entirety. The Mirroring Application describes a dual-format database that allows existing row-major on-disk tables to have complementary in-memory columnar representations.

Various approaches have been developed for generating execution plans for queries on in-memory columnar tables compared to queries containing only row-major on-disk tables. One approach is to make no changes to the query optimizer, with the expectation that the change in table scan performance itself will make the queries perform better. Unfortunately, an execution plan generated by an optimizer designed for an on-disk row-major format may be sub-optimal on an in-memory columnar format.

Rather than making no changes to the optimizer, alternative approaches may involve (a) using simple heuristics to allow the optimizer to generate different plans, or (b) making optimizer enhancements for specific types of workloads, such as execution of star queries. However, neither of these approaches is likely to perform optimally under a variety of workloads on databases with varied schemas and different data formats running on arbitrary hardware configurations with dynamic system constraints (such as available memory).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
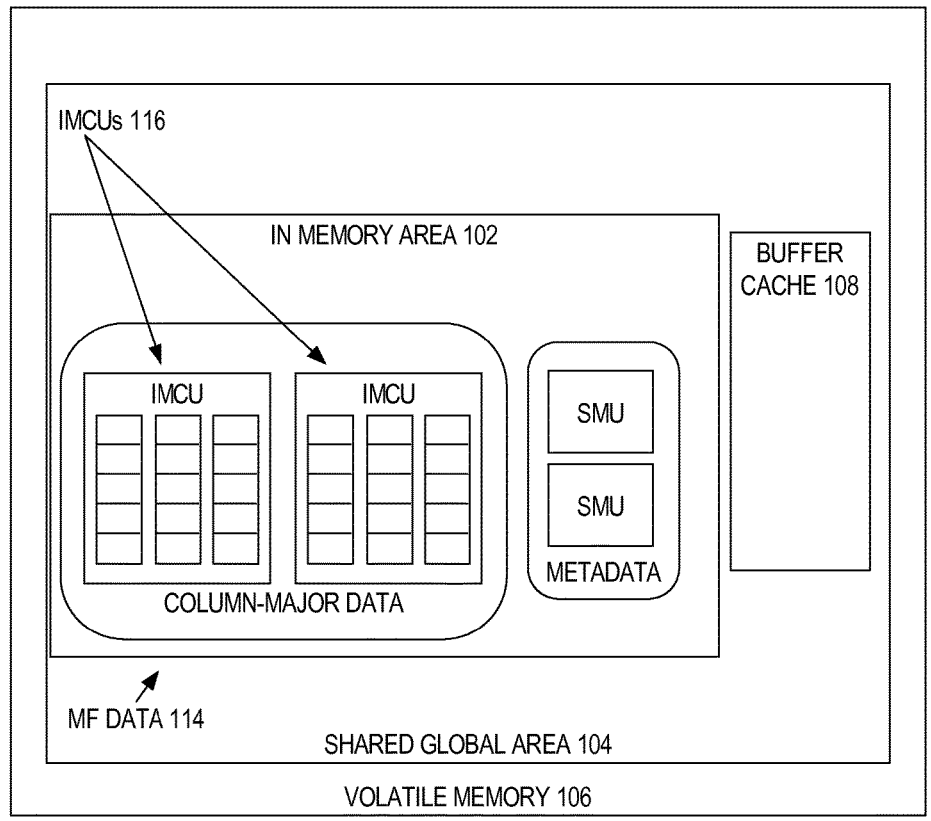
FIG. 1 is a block diagram illustrating column-major in-memory compression units in a dual-format database system.
Figure 1:
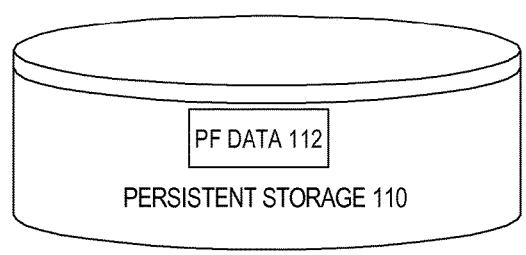

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for creating an in-memory-aware optimizer that selects an execution plan, among multiple candidate execution plans, in a manner that takes into account the availability of in-memory data within a dual format database system. As described in the Mirroring Application, dual format database systems are systems in which data for the same table is stored persistently in one format (hereinafter the "PF format"), and within volatile memory in another format (hereinafter the "MF format"). The data stored persistently in the PF format is referred to herein as "PF data". The data, stored in volatile memory, in the MF format is referred to herein as "MF data".

For the purpose of explanation, embodiments are described hereafter in which the PF format is row-major, while the MF format is column-major and compressed. However, these are merely examples of the numerous combinations of formats that may be used for the PF data and MF data in a dual format database system. Regardless of the specific formats employed by a dual format database system, the PF format always differs from the MF format, and all items in the MF data are copies of items also available from the PF data. However, not all PF data need to be available as MF data, and accessing MF data is usually faster compared to PF. Consequently, whether it is more efficient to use the MF data than the PF data to satisfy a database request hinges, among other things, on the nature of the database operations that need to be executed, and is specific to the query.

According to one embodiment, the in-memory-aware optimizer uses an in-memory-aware cost model to generate and select plans optimized in a manner that accounts for the existence and availability of MF data. The in-memory cost model may be used by the in-memory-aware optimizer, for example, to determine the cost of in-memory table scans and joins. This cost is compared to the cost of alternative plans (such as plans that do not make use of the MF data) to determine the optimal plan.

According to one embodiment, the in-memory cost model for a table scan is modeled on the in-memory scan process, and includes both CPU costing and I/O costing. For CPU costing, the cost model applies a pruning ratio to determine how many in-memory compression units are left after storage index pruning. Then, the optimizer computes the cost of:
 predicate evaluation on compressed data;
 decompressing the compression units;
 row-stitching; and
 scanning the transaction journal.

Each of these costs shall be described in greater detail hereafter.

For tables which are partially populated in-memory, I/O costs are added for accessing portions of the table that are on disk. The cost model also takes into account partition pruning for partitioned tables, and properly sums up the cost after partition pruning.

In-memory statistics are needed to accurately estimate the cost of execution plans for queries with in-memory tables. Without these statistics, the chosen plan may not be optimal. Therefore, according to one embodiment, in-memory statistics are used as inputs to the cost model to determine the cost of scanning in-memory tables. According to one embodiment, metrics of the in-memory statistics include:
 number of in-memory compression units,
 number of in-memory rows,
 number of transaction journal rows in-memory,
 number of blocks in-memory, and
 the in-memory quotient.

Each of these statistics shall be described in greater detail hereafter.

According to one embodiment, in-memory statistics are collected at the segment level of each table, and aggregated across segments, and they are kept in sync with the disk statistics. Further, in systems where multiple database servers, executing on different nodes, are used to access the same on-disk database, in-memory statistics are also synchronized across the nodes such that each node could execute the same query plan in parallel.

Dual-Format Database Overview

As described in detail in the Mirroring Application, within a dual-format database, data from a table can reside in both columnar format in an in-memory column store and in row-major format on disk. The in-memory columnar format speeds up analytic queries and the row-major format is well-suited for answering On-Line Transaction Processing (OLTP) queries.

It should be noted that scanning on-disk tables does not necessarily incur disk I/O. Some or all of the blocks of the table-to-be-scanned may be cached in volatile memory, in PF format, in a buffer cache. Thus, within a dual-format database, it is possible for there to be at least three copies of the same piece of data available: (a) a copy in PF format on persistent storage, (b) a copy in PF format in volatile memory (the buffer cache), and (c) a copy in MF format in volatile memory (within the MF data).

Referring to FIG. 1, it is a block diagram of a dual-format database, according to one embodiment. In the embodiment illustrated in FIG. 1, the dual-format database includes a dedicated in-memory column store, called the In-Memory Area 102, which acts as the storage for columnar data. The in-memory area 102 is a subset of the database shared global area 104 (SGA), which has been allocated from volatile memory 106.

The process of creating and storing of columnar data in the in-memory area 102 is called population. Population is done based on the on-disk row-major data (PF data 112). Specifically, the in-memory area 102 is populated by reading items from PF data 112, which resides on persistent storage 110, converting the items into the MF format, and storing the items in the in-memory area 102. In the illustrated embodiment, the MF format is a columnar representation that includes contiguously allocated chunks called In-Memory Compression Units (IMCUs 116).

Figure 2:
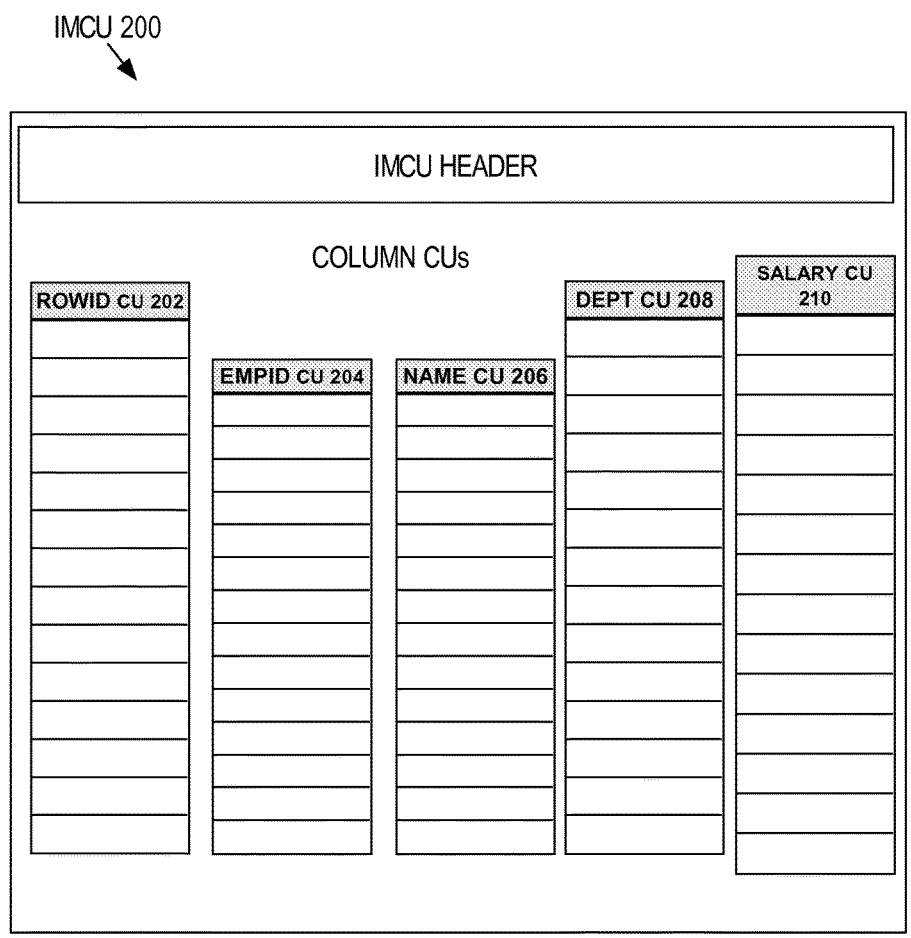
FIG. 2 is a block diagram illustrating column units within an in-memory compression unit, according to an embodiment.

Referring to FIG. 2, it is a block diagram illustrating an IMCU 200 in greater detail, according to an embodiment. In the embodiment illustrated in FIG. 2, IMCU 200 contains items extracted from a set of rows of an "emp" table (not shown). The emp table itself is stored on persistent storage 110 as part of the PF data 112.

Within IMCU 200, items from each column of the emp table are stored separately and contiguously as a column Compression Unit (CU). Specifically, IMCU includes CU 202, CU 204, CU 206, CU 208 and CU 210 that respectively contain items from the emp table columns "rowid", "empid" "name" "dept" and "salary".

According to one embodiment, partitions and sub-partitions of a partitioned table are organized into IMCUs independently of each other, and an IMCU does not span multiple partitions. A single partition can, however, have multiple IMCUs.

Each column may be compressed at different compression levels. For example, CU 202 may be compressed at a compression level CL1, while CU 204 is compressed at a compression level CL2. Further, different CUs of the same column maybe compressed differently. For example, in IMCU 200, CU 202 for the rowid column may be compressed at level CL1, but in a different IMCU, the CU for the rowid column may be compressed at a different level CL2.

Different compression levels are suitable for different use cases. For example, compression techniques have been developed that are specifically optimized for DML performance. Other compression techniques are optimized for query performance. Yet other techniques are optimized for space capacity.

Selective Population of the In-Memory Area

It is not necessary for an entire table to be populated in-memory. Also, due to memory constraints, the entire data of a table may not all fit in memory. For example, it is possible that only 250,000 rows of table emp are populated in-memory, even though table emp may have 1,000,000 rows. This may be accomplished, for example, by partitioning the emp table by range on one of its columns, and loading fewer than all of the partitions in memory. Consequently, for partitioned tables, it is possible to enable some of the partitions for in-memory and leave others only on disk.

In addition, it is not necessary for all columns of a table to be populated. Thus, if memory is a constraint, users can decide what tables and columns to enable for in-memory. In the embodiment illustrated in FIG. 2, five columns of the emp table have been loaded into IMCU 200, even though the emp table may actually have ten times that many columns.

Shared-Disk Clusters

In some embodiments, multiple database server instances operate as a shared-disk cluster, where the database server instances run on different nodes but access a common database. While the on-disk data is shared, each node has its own private in-memory area that is accessible only to that node's instance.

Various techniques may be used to populate in-memory tables in a shared-disk cluster. For example, according to one embodiment, a shared-disk cluster supports a DUPLICATE mode and a DISTRIBUTE mode.

Under DUPLICATE mode, all the IMCUs are populated on at least two instances. This provides fault tolerance in case one of the instances goes down. The DUPLICATE ALL mode populates all the IMCUs on all instances; this provides full fault tolerance.

In one embodiment, the DISTRIBUTE mode has three options: distribution by PARTITION, by SUBPARTITION, or by ROWID RANGE. The DISTRIBUTE AUTO option lets the database server choose the distribution method.

The DISTRIBUTE mode provides a way to efficiently use the combined in-memory areas of all nodes and access the data using parallel queries on the in-memory tables. However, if the query is executed in serial on a single instance, there will be disk I/O since only part of the table will be populated in-memory on the executing node. Depending on the execution plan, running in parallel might also result in disk I/O whenever a process is trying to access data not residing in local memory. Thus, even though a table may be fully populated in-memory in a shared-disk cluster, it is possible to incur disk I/O depending on the execution plan.

In-Memory Scan Overview

An in-memory scan refers to the operation of obtaining at least some of the data items that satisfy a query from the MF data 114, rather than the PF data 112 (or cached copies of the PF data 122 stored in buffer cache 108).

According to one embodiment, an in-memory scan starts by locating the IMCUs that contain the required rows. Within each IMCU, it is typically only necessary to look at the CUs of the columns referenced in the query. According to one embodiment, all necessary columns must be in-memory-enabled to use an in-memory scan. For example, in such an embodiment, the query "select empid, name from emp where salary >100" may be satisfied by an in-memory scan of IMCU 200 (because IMCU 200 includes values for the columns empid, name, and salary), while the query "select empid, name, age from emp where salary >100" would not (because "age" is not one of the columns for which IMCU 200 has a CU.

According to one embodiment, each CU has an in-memory storage index that contains the minimum and maximum column values for all rows in that CU. The storage index is used to prune CUs using predicates on the column. Even if a CU is not pruned, certain predicates are much more efficiently evaluated on compressed data compared to the SQL execution engine. Thus, in some embodiments, the database server pushes down many types of predicates to the in-memory scan.

When rows are deleted from a table that contains the PF data, the corresponding entries in the IMCUs for these rows are marked as invalid. When new rows are inserted into an in-memory table, they are first stored in an in-memory row-major transaction journal until they reach a certain threshold, after which the IMCUs are rebuilt. Thus, when scanning an in-memory table, invalid rows from the CUs are skipped and additional rows in the transaction journal are scanned. Transactional consistency is maintained in all cases.

Query Optimization Overview

Within a dual-format database, the existence of the MF data, and the format and compression used thereby, fundamentally changes the performance characteristics of operations like scans, joins and aggregations. New query execution techniques, like vector predicate evaluation and bloom filter pushdown into scans, are possible on columnar tables.

On a shared-disk cluster, in-memory tables can be distributed in the in-memory areas of different nodes, making it shared-nothing with respect to the separate in-memory column stores. A query optimizer designed only for row-major disk-based tables is unlikely to yield plans that are optimal when some or all of the tables are in-memory.

As shall be described in greater detail hereafter, enhancements to the optimizer are provided to take into account the existence and availability of in-memory tables. These enhancements ensure that the optimizer generates plans that are optimal regardless of whether tables are fully, partially, or not at all in-memory and whether queries are executed on a single node or on a cluster.

Query Optimizer

Figure 5:
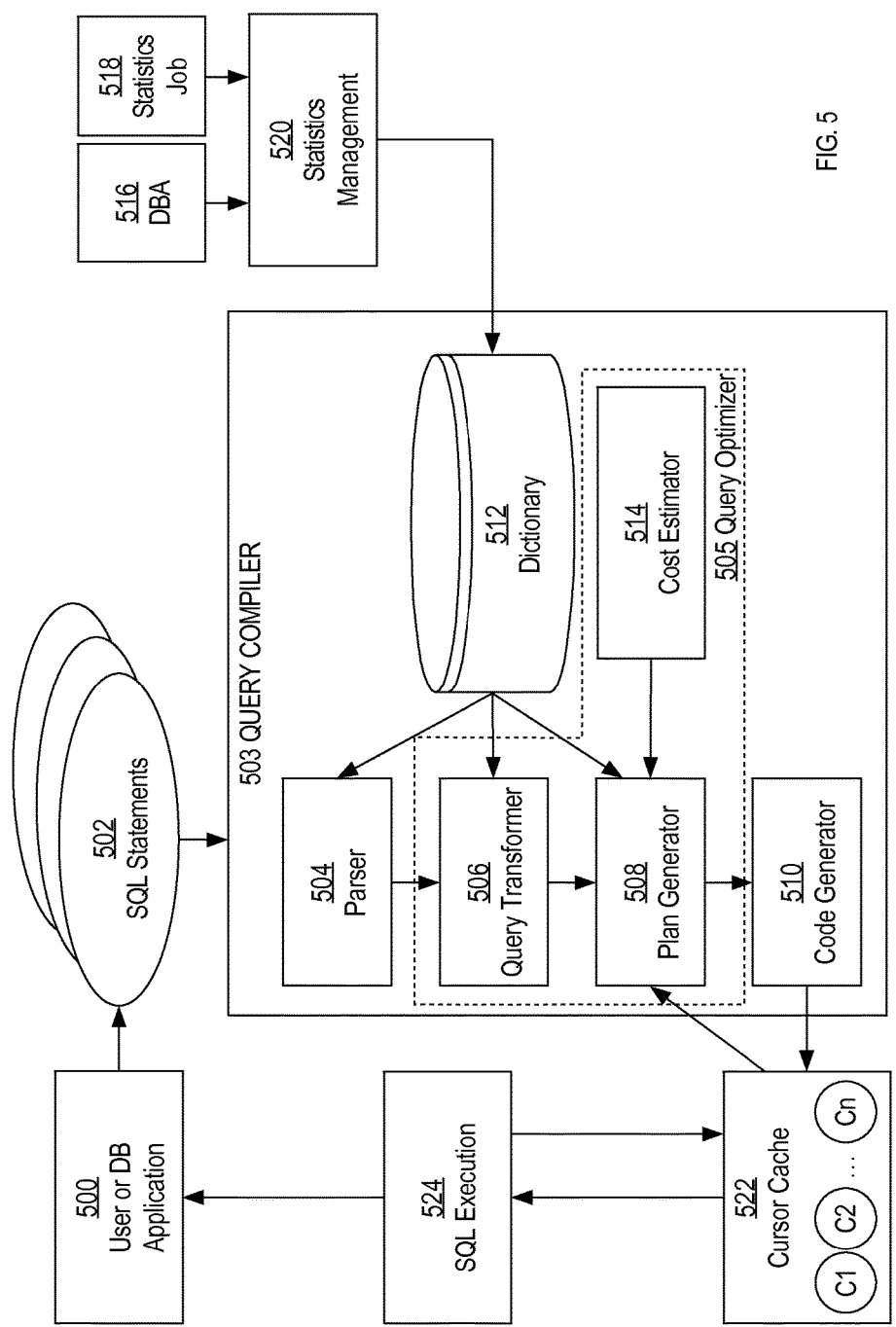
FIG. 5 is a flowchart illustrating the query optimizer components and how these components interact with other database system components to process a query.

Each database server instance contains a query optimizer to receive a query and determine an optimized query execution plan. FIG. 5 is a flowchart illustrating the query optimizer components and how these components interact with other database system components to process a query. The cost estimator 514 computes predicate selectivities (which help determine the resulting cardinalities of scans, joins, and aggregations) and estimates the costs of various database operations including access paths, join methods, aggregations, communication between parallel processes, and many more. A cost-based query transformer 506 works in conjunction with the estimator 514 to enumerate and compare semantically equivalent forms of the query. Transformations may include, but are not limited to, OR expansion, view merging, predicate pushing, subquery unnesting, query rewrite with materialized views, star transformations, in-memory aggregation, table expansion, and join factorization.

The query plan generator 508 generates and selects the optimal access method, data distribution method, and other database operation methods for the given query. For example, for a join query, the plan generator 508 determines the optimal join method and join order for the query execution plan. Some of these techniques perform better on disk than in-memory and vice versa due to on-disk specific costs and in-memory specific costs described herein based on the specific query. For these reasons, it is essential for the query optimizer to consider the cost of each technique both on-disk and in-memory.

The query optimizer 505 interacts with other database system components to process a query in the most efficient manner. Generally, a user or database application 500 creates an SQL statement 502. The SQL statement 502 is received by the query compiler 503. The query parser 504 checks the validity of the SQL statement using information in the dictionary and parses the query into intermediate representations. The Optimizer takes the results of the parser as well as the optimizer statistics as input and selects the lowest cost execution plan. These statistic may be managed by a database administrator 516 and/or a statistics job 518 at a statistics management component 520. A code generator 510 generates the run time representation of the execution plan based on the execution plan picked by the Optimizer. If the code generator 510 cannot reuse existing code, then it must build a new executable version of the code. The cursor cache 522 stores a cursor for the execution plan. During SQL execution 524, a database server instance that is executing the query execution plan has access to the cursor cache 522. After finishing SQL execution 520, the result is returned to the user or database application 500.

In-Memory Statistics

A query optimizer needs accurate statistics to generate optimal plans. Thus, an optimizer that is to account for the existence and availability of MF data needs accurate statistics relating to the MF data. According to one embodiment, the database server maintains both object statistics and system statistics relating to the MF data. During query compilation, the query optimizer collects statistics relevant to the particular query. The optimizer may, for example, query the real-time metadata information of a queried in-memory table to collect in-memory statistics for that table. In some embodiments, predicate filtering techniques (for example storage index pruning) may be applied while querying the metadata. Applying these techniques can produce additional statistics such as the storage index pruning ratio.

Object statistics refer to statistics that correspond to a particular database object, such as a database table, column, partition, index, etc. Object statistics on tables and columns can be categorized as logical or physical. Logical statistics are a function only of the data, not the table's storage format. Such logical statistics may include, among other things:
  the number of rows,
  average row length,
  column histograms, and
  column minimum and maximum values and number of distinct values in the column Auxiliary structures like indexes also have logical statistics like number of distinct index keys.

Physical statistics of tables are a function of the data, their storage representation and database settings. For row-major on-disk tables, physical statistics may include, among others:
  the number of blocks, and
  the number of chained rows.

System statistics, on the other hand, relate to the environment in which the query is being executed. For example, system statistics may include, among others:
  the number of CPUs,
  CPU speed,
  I/O throughput,
  number of nodes in the cluster, and
  available memory.

According to one embodiment, dual-format database servers maintain various additional physical table statistics in order to determine costs associated with execution plans that obtain at least a subset of the data items that are required by a query from IMCUs. Such statistics are referred to hereafter as "in-memory statistics".

According to one embodiment, in-memory statistics include:
  number of IMCUs,
  number of in-memory blocks,
  number of in-memory rows,
  number of in-memory transaction journal rows, and
  an in-memory quotient.

For partitioned tables, in-memory statistics, like other table statistics, are maintained at the partition level. Table-level in-memory statistics are derived by aggregating partition-level statistics.

The in-memory statistics are gathered along with corresponding on-disk statistics. In some embodiments, consistency is maintained between in-memory statistics and on-disk statistics. Techniques for maintaining consistency include capping and prorating. Capping applies the constraint that in-memory copies of data are a subset of on-disk data. For example, the number of in-memory blocks should never be greater than the number of on-disk blocks. Thus, the in-memory blocks may be capped at the number of on-disk blocks to keep the statistics in-sync. Prorating applies the constraint that subsets of data should have statistics that correspond to smaller groups of the larger set. For example, if the query optimizer gathers on-disk statistics without gathering statistics for on-disk partitions, statistics on the partitioned data may be extrapolated as subsets of the on-disk statistics. Other techniques such as capping may then be applied to the prorated statistics. The pro-rating technique is particularly effective when a table is sub-partitioned, and statistics are not gathered for every sub-partition. Consistency ensures that the estimations using the different statistics are at least relatively accurate.

In some embodiments, the in-memory statistics are stored on disk to facilitate reuse between queries as well as synchronize statistics between different database server instances.

The In-Memory Quotient

An in-memory block corresponds to a specific disk block of the table. If the table is fully populated in-memory, there will be an equal number of in-memory blocks and on-disk blocks. A table partially populated in-memory will have a smaller number of in-memory blocks compared to the on-disk blocks.

The "in-memory quotient" is the ratio of the in-memory blocks to the number of on-disk blocks. Its value ranges from 0 to 1, both inclusive, and it indicates the fraction of the table that is populated in-memory. If an in-memory table is partitioned, the in-memory quotient is computed for each partition, since in-memory statistics are partition-specific.

According to one embodiment, in-memory statistics are maintained in real-time, since parts of a table can be populated in or evicted from the in-memory area at any time. For example, if enough new rows are inserted into a table, then the number of IMCUs might change. If a large number of rows are inserted and there is not enough space in the in-memory area, then some rows will remain on disk only, which changes the in-memory quotient to less than 1. The optimizer takes into account the current in-memory statistics during query compilation to ensure accurate costing and plan selection.

For queries on partitioned tables, the optimizer can sometimes determine the partitions that must be scanned by analyzing the predicates on the table. If this partition pruning is possible at compilation time, the optimizer computes in-memory statistics for the table by aggregating the in-memory statistics of each remaining partition. Consider a table with four partitions, P1 through P4, where P1 and P2 are on-disk while P3 and P4 are both on-disk and in-memory. For these partitions, suppose I1 through I4 are the number of in-memory blocks and B1 through B4 are the number of disk blocks. Since P1 and P2 are on-disk, I1 and I2 will be 0. The in-memory quotient of the entire table is (I3+I4)/(B1+B2+B3+B4), which is a value less than 1 since the number of in-memory blocks can be at most the number of on-disk blocks.

Consider three possible queries Q1, Q2 and Q3 on this table where partition pruning takes place. Assume that, for query Q1, only partitions P1 and P2 must be scanned (P3 and P4 were pruned). Under these circumstances, the optimizer will compute the aggregate in-memory quotient as 0, since these two partitions are disk-only. In other words, this query will be satisfied purely from a disk scan with no benefit from in-memory.

Assume that, for query Q2, only partitions P3 and P4 must be scanned (P1 and P2 were pruned). The aggregate in-memory quotient will be computed as (I3+I4)/(B3+B4). This value will be 1 if these two partitions are entirely in-memory (I3 and I4 will be equal to B3 and B4, respectively) which means that the table scan will be entirely from in-memory with no disk access.

Assume that, for query Q3, partitions P2 and P3 must be scanned (P1 and P4 were pruned). Under these circumstances, the aggregate in-memory quotient will be I3/(B2+B3) which is a value less than 1. This matches the fact that the scan of P2 will be from disk and that of P3 will be from in-memory.

As the above example shows, the aggregation of in-memory statistics after partition pruning allows the optimizer to accurately estimate scan costs that reflect the true cost. In such cases, using global in-memory statistics is not appropriate. This is especially important because partitions are often highly skewed with some containing far more data than others.

Statistics in Shared Disk Clusters

When executing queries in a system that has multiple nodes that are each executing an instance of a database server, each instance compiles the query separately. The instance where the query is submitted compiles and generates the initial execution plan followed by each of the other instances doing the same. According to one embodiment, each instance tries to reproduce the same execution plan.

On a shared disk cluster, each instance has its own in-memory area. Suppose a query references an in-memory table. If this table is defined as DUPLICATE ALL, it will be populated in the in-memory areas of each instance. This means that the local in-memory statistics of the table are the same on all the instances. Thus the optimizer on each instance will estimate the same cost for the table scan and generate the same plan for the query.

However, the in-memory table may instead be defined as DISTRIBUTE AUTO. Under these circumstances, the table will be distributed in the in-memory areas of each instance so that no instance has the entire table in its in-memory area. In other words, different chunks of the table will be in IMCUs distributed among the various nodes of the cluster. The in-memory statistics on each instance will reflect this, with an in-memory quotient that will be less than 1.

According to one embodiment, the query execution engine allocates parallel processes on each instance in such a way that the entire table scan is satisfied purely with in-memory scans from the instances where the data is populated in the in-memory area. For example, assume that table X is divided into three partitions P1, P2 and P3. Assume further that node 1 has an IMCU for P1, node 2 has an IMCU for P2, and node 3 has an IMCU for node P3. Under these circumstances, the instance on node 1 is assigned to scan partition P1, the instance on node 2 is assigned to scan partition P2, and the instance on node 3 is assigned to scan partition P3.

If a query includes distributed in-memory tables, the optimizer computes the effective in-memory statistics. These statistics are computed by collecting the local in-memory statistics for a single node and extrapolating global statistics based on the population technique used for the queried table(s). Based on the population technique used and the local in-memory statistics, assumptions may be made about the distribution of data. For example, in the case where data is distributed in-memory by partition, additional statistics such as the skewed distribution of partitioned data may be extrapolated. Assume table X is distributed in-memory by partition on three nodes 1, 2 and 3. The effective number of in-memory blocks for table X is the sum of the in-memory blocks in each of nodes 1, 2 and 3. However, if node 1 hosts no in-memory blocks for table X, then table X must be distributed on nodes 2 and 3.

Each instance must have the same synchronized in-memory statistics in order to generate the same execution plan. Failure to generate the same execution plan will result in a failure of parallel slaves in joining in the query execution. The failure would eventually result in the query executing on one node in serial mode.

Optimizer Use of Statistics

The optimizer uses logical object statistics primarily to estimate cardinalities of various operations like table and index scan, join, and GROUP BY. The estimated cardinalities, along with physical object statistics and system statistics are used to estimate costs for these operations.

Accurate costs are necessary to choosing the best plan from among several alternatives; this means that complete and up-to-date statistics are a must for the optimizer. For in-memory tables, the same logical object statistics for disk-based tables are still valid since they are used to estimate cardinalities which are independent of the physical storage representation of the data. Physical object statistics, however, depend on the actual data storage format. Since a dual format database system allows tables to be declared in-memory, new physical object statistics are needed for such tables. According to one embodiment, indexes cannot be declared in-memory and thus no new statistics are needed for them.

Cost Model

A query optimizer takes into account object statistics, system statistics, and database settings when evaluating alternative execution plans. The cost model of an optimizer includes I/O, CPU, and network communication costs.

Scans of on-disk row-major tables have different I/O and CPU costs than in-memory columnar tables. Using the costing techniques described herein, the cost model has been enhanced to include new cost formulas for in-memory tables. The in-memory-aware optimizer supports queries with any combination of on-disk row-major tables and fully or partially populated in-memory columnar tables. The awareness extends to shared-disk clusters, where the tables may be duplicated or distributed in the in-memory column stores of different instances.

According to one embodiment, some of the new cost components in the cost model include storage index pruning cost, decompression cost, predicate evaluation cost, row stitching cost, and transaction journal scanning cost.

Storage Index Pruning Cost

Storage index pruning cost: The optimizer estimates how many IMCUs must be scanned after the in-memory storage index prunes non-matching IMCUs. This is computed by applying the table filter predicates on the minimum and maximum values of the corresponding column CU. Consider the predicate c1<10. Suppose the minimum value of one of the column's CU is 15. Then the database server can safely prune away that CU for scanning since none of its rows will satisfy the predicate. The optimizer determines this for every CU of the column. If there are predicates on multiple columns, say c1<10 AND c2>5, the pruning is computed for each column.

If these predicates are AND-ed, the optimizer can prune an IMCU if any single predicate prunes its column's CU. Because storage index pruning requires scanning every IMCU header, the optimizer includes this in its cost for the table scan. According to one embodiment, the costs for the operations required to execute a query are included only for the IMCUs remaining after storage index pruning In the corner case where all IMCUs are pruned, none of the following costs will apply.

Predicate Evaluation Cost

Predicate evaluation cost: Predicate evaluation on in-memory tables takes place during the scan. For example, the predicate c1<10 may be evaluated on encoded column values while the CUs for c1 are being scanned. In addition, the evaluation can be done on multiple rows using vector operations on a SIMD system. If there are multiple AND-ed predicates like c1<10 AND c2>5, the evaluation of any subsequent predicate is skipped if the column value has been filtered out by a previous predicate in the chain.

Decompression Cost

Decompression cost: At run-time, column CUs must be decompressed to retrieve the corresponding values. This must be done for all referenced columns for the table after evaluating filter predicates on the compressed columns. The decompression cost of a CU is a function of the compression method used for that CU. Different CUs, even for the same column, may be compressed differently.

Row Stitching Cost

Row stitching cost: Data items obtained from MF data is in column-major format. However, query execution engines are typically designed to perform operations on data in row-major format. Thus, some overhead is incurred, when data items are obtained from the MF data, to "stitch" those items together to form rows. Thus, the row stitching cost includes stitching all projected columns into rows for a subsequent operation, like join, in the plan.

Transaction Journal Scan Cost

Transaction journal scan cost: The in-memory transaction journal contains rows that were inserted or updated by DML statements but that have not yet been populated in IMCUs. According to one embodiment, these rows are in row-major format and must be scanned in addition to the data in the IMCUs.

Aggregating Costs to Determine Cost of Execution Plan

All the above-enumerated costs apply to the scan of the in-memory portion of a table. Consider a table with B disk blocks and N rows that is partially populated in-memory. The in-memory statistics will reflect the partial population status: the in-memory quotient will be q (<1) and number of in-memory blocks will be Bq (<B). A scan of this table will require reading both the in-memory and on-disk portions. The in-memory scan cost is computed as described above using the in-memory statistics. The on-disk scan cost is computed using the standard cost model for row-major tables but with prorated statistics of B(1-q) blocks and N(1-q) rows (this cost will include both I/O and CPU). These costs are then combined to get the total table scan cost. For partitioned tables, the optimizer uses aggregated in-memory statistics as described above. This ensures that partition pruning is correctly accounted for in the cost model.

Execution Plan Selection Example

Figure 3:
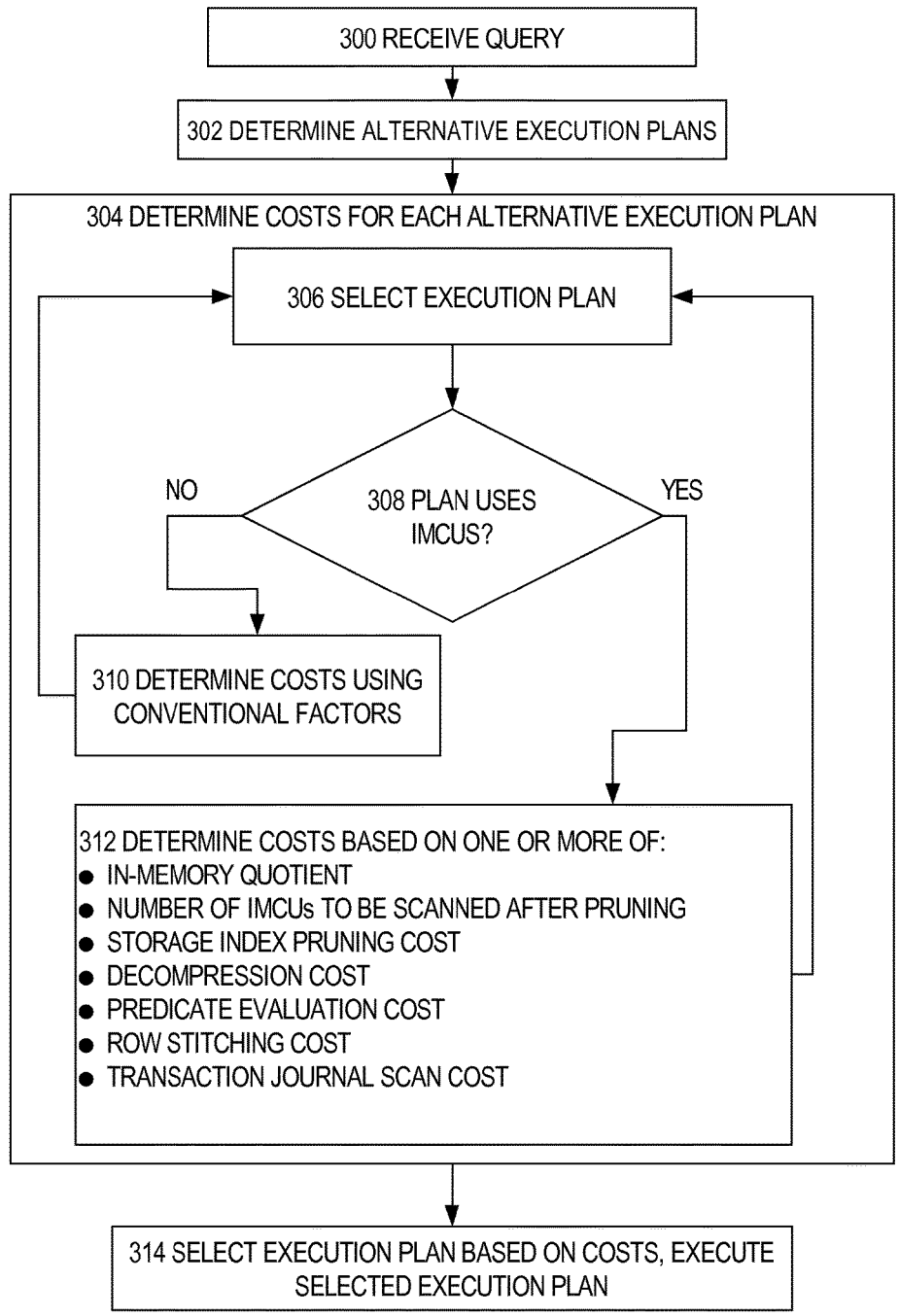
FIG. 3 is a flowchart illustrating steps for selecting among alternative execution plans for a query where at least some of the data accessed by the query is available in a column-major in-memory compression-unit.

Referring to FIG. 3, it is a flowchart that illustrates steps performed by an optimizer to select which execution plan to use to execute a query. At step 300, a database server instance receives a query. For the purpose of illustration, it shall be assumed that the query received in step 200 is "select rowid, name from emp where salary >200".

At step 302, several alternative execution plans are generated for the query received in step 300. All execution plans are semantically equivalent in that they all produce the same results (i.e. all produce the result set of the query received in step 300). However, each execution plan represents an alternative way to obtain those results.

For example, the alternative plans may include:
  plan A: perform a full table scan that obtains at least some data items from the MF data
  plan B: perform a full table scan that does not make use of the MF data
  plan C: identify matching rows using an index X whose index key has "salary" as a prefix, then read matching rows from the PF data
  plan D: identify matching rows using an index Y whose index key is different from index X, but which also has "salary" as a prefix, then read matching rows from the PF data In this example, plans B, C and D do not make any use of IMCUs. Therefore, the cost of those plans may be generated using conventional means that do not take into account in-memory statistics. In addition, in some embodiments, it is assumed that a full table scan will make use of any existing MF data that contains the needed data items. In such embodiments, plan B would not be separately considered. In contrast to the other plans, plan A calls for a full table scan in which, to the extent possible, data items are obtained from MF data (e.g. from IMCU 200) rather than the PF data.

Referring again to FIG. 3, at step 304 the optimizer determines a cost for each of the alternative execution plans. Specifically, for plans (such as plans B, C and D) that do not make use of MF data, control passes from step 308 to step 310, where costs are determined based on conventional factors. On the other hand, for plans (such as plan A) that do make use of MF data, control passes from step 308 to 312, where the cost of the plan is determined based on additional factors, such as the in-memory quotient, the number of IMCUs to be scanned after pruning, the storage index pruning cost, the decompression cost, the predicate evaluation cost, the row stitching cost and the transaction journal scan cost.

In the present example, it shall be assumed that IMCU 200 has all of the values from columns rowid, name, and salary. Under these circumstances, the in-memory quotient would be 1, indicating that all of the data items needed to satisfy the query are in the MF data. If, on the other hand, IMCU 200 only stored values for a particular range of rows, and data items outside that range were not pre-loaded into any IMCU, then the in-memory quotient would be less than 1.

The storage index pruning cost, in the present example, would be the cost of comparing the value "200", from the predicate "salary >200", to the max value (maintained in the "storage index" of IMCU 200) for the "salary" column. If, in the storage index of IMCU 200, the max value for "salary" is less than 200, then it is not possible for any row within IMCU 200 to satisfy the predicate salary >200. Therefore, the IMCU 200 would be pruned.

Assuming that IMCU 200 is not pruned, then the decompression cost represents the overhead required to decompress IMCU 200. The decompression cost may vary significantly based on the technique used to compress the data items in IMCU 200. According to one embodiment, only the decompression that is required to obtain the result set of the query is considered. For example, the query "select rowid, name from emp where salary >200" does not require data items from the "dept" CU 208, so the decompression cost for plan A would not count the cost of decompressing the dept CU 208.

The predicate evaluation cost is the cost of determining which rows satisfy the predicate "salary >200". Assuming that IMCU 200 is not pruned, the predicate evaluation cost represents the overhead of comparing the value "200" against the data items in the salary column that are obtained from CU 210. This cost may be reduced, for example, by loading a series of the values in a SIMD register, and concurrently comparing each of the values in the SIMD register against the value "200". Use of a SIMD register to concurrently evaluate a predicate against many values from a given column is described, for example, in U.S. patent application Ser. No. 13/916,284, the contents of which are incorporated herein by reference.

As mentioned above, for execution plans that require table scans of partitioned tables, the in-memory statistics may be gathered on a per-partition basis, and those per-partition statistics may then be summed to generate a table-wide statistics. In addition, when IMCUs for a given table are spread across numerous nodes of a multi-node shared-disk cluster, the database server instance on each node determines the cost of the execution plan.

After costs have been determined for each of the alternative execution plans (step 304), control passes to step 314. At step 314, the optimizer selects one of the execution plans based on the costs. Typically, since all execution plans are valid and produce the same results, the optimizer will select the plan with the least cost. In shared nothing clusters, the execution plan that is selected may involve executing a portion of the work on one node (because that node has the IMCU for a particular portion of the table), and executing a different portion of the work on a different node (because that node has the IMCU for a different portion of the table).

Execution Plan Options

In the example given above, the optimizer generates costs for four distinct execution plans. However, any given query may have any number of viable execution plans. For example, a plan may be to use index X to identify rows, and then obtain values from the matching rows from the PF data, while another plan uses index X to identify rows, and then obtain values from the matching rows from the MF data. If the query involves a join between tables, the number of execution plans may increase exponentially, where MF data may be used to obtain data items from one table, while PF data is used to obtain data items from another.

Similarly, the number of semantically equivalent execution plans may increase when the table(s) involved in the query are partitioned, where for each partition, there is an option of obtaining the data items from the MF data, from the PF data, and/or through the use of multiple available indexes in combination with the MF data and/or PF data.

Table Expansion

In situations where use of MF data is not an option for some of the data required by a query, a "table expansion" technique may be used by the cost-based optimizer. Table expansion involves dividing an original query into multiple derivative queries, where aggregating the results of the multiple derivative queries produces the result set of the original query. More specifically, an original query is divided into (a) one or more derivative queries that access data items that are only available in the PF data ("PF derivative queries"), and (b) one or more derivative queries that access data items are available in both the PF data and the MF data ("MF derivative queries"). The cost of the original query is obtained by summing the costs of the derivative queries.

Table expansion is useful because the cost of PF derivative queries can be determined without consideration of in-memory statistics, since no MF data is available to satisfy those queries. For example, assume that the emp table is divided into two chunks, the first of which includes rows 0 to 10000, and the second of which includes rows 10001 to 20000. Further assume that the first-chunk is not duplicated in any MF data, and that the second-chunk has been loaded into IMCU 200. Under these circumstances, the query "select rowid, name from emp where salary >200" may be divided into:

PFDQ: a PF derivative query that applies "select rowid, name from emp where salary >200" to rows 0 to 10000, and MFDQ: an MF derivative query that applies "select rowid, name from emp where salary >200" to rows 10001 to 20000.

In the present example, the cost of PFDQ can be determined separately and independently of the cost of MFDQ, without reference to in-memory statistics. Even though use of MF data is not an option for PFDQ, there may still be several execution plans to evaluate for PFDQ. For example, PFDQ may have an execution plan that involves a full table scan, another execution plan that involves use of one index, and yet another execution plan that involves use of another index.

MFDQ, on the other hand, may have all of the execution plan variations as PFDQ, plus additional execution plan variations that involve taking advantage of the fact that MF data exists for the data items required by MFDQ. Determining a cost for those additional execution plan variations involves using of the in-memory statistics, as described above.

The table expansion technique is also referred to herein as "hybrid data access". Specifically, in a dual-format database system, a table may be partially populated in-memory so a scan operation on such a table must be able to process both on-disk database blocks as well as in-memory CUs. Since the cost and time of reading on-disk data is very different than reading in-memory data, it is possible that an index may perform better than a full table scan for on-disk data but not for in-memory data. In other words, the best way to access data from a partially populated in-memory table may be a hybrid access path: index access path for on-disk data and an in-memory scan for in-memory data. The same principle applies when joining to a partially in-memory table: a nested loops join can be used for the on-disk data and a hash join can be used for the in-memory data.

To take advantage of the different access paths available for queries on partially-populated tables, the optimizer has been enhanced to generate hybrid execution plans when the query accesses a mix of on-disk and in-memory table partitions.

According to one embodiment, the hybrid plan optimization for in-memory tables has been implemented as a new cost-based query transformation which rewrites a query into a semantically equivalent form where the table is replaced by a UNION-ALL view with two branches: one branch represents the access to the in-memory data only and the other branch represents the access to the on-disk data only. Each branch has filter conditions to restrict access to the relevant partitions. Other operations in the query (e.g., join) can be pushed into the UNION-ALL view.

A cost-based decision determines which operations to push into the view and therefore includes all factors that are taken into account in the cost model. For example, consider the following query which returns the average revenue per zip code in outlet stores for year 2014:

SELECT stores.zipcode, avg(sales.revenue)
  FROM sales, stores
    WHERE sales.store_id=stores.id
      AND stores.type='Outlet'
      AND sales.sales_date between '01-01-2014'
      AND '12-31-2014'
  GROUP BY stores.zipcode For the purpose of illustration, assume that table SALES has indexes on some of the columns commonly used to join to dimension tables. One such index is on column store_id. The table is partitioned monthly on the sales_date column, i.e., every partition contains data for a single month of a single year.

With most queries accessing data from a subset of the partitions, the table definition is changed to make the October to December partitions in-memory. Since the query accesses data from all of year 2014, the query optimizer has an opportunity to use a different execution plan for the January-September partitions than for the October-December partitions.

An example of such an execution plan is shown below. The optimizer generated a hybrid execution plan with the first branch using a nested loops join to fetch rows from SALES using an index on the join key, and the second using a hash join to fetch rows from SALES using an in-memory scan.

| ID | Operation | Name |
|---|---|---|
| 0 | SELECT STATEMENT | |
| 1 |   HASH GROUP BY | |
| 2 |     VIEW | VW_TE_5 |
| 3 |       UNION-ALL | |
| * 4 |         TABLE ACCESS BY INDEX ROWID | SALES |
| 5 |           NESTED LOOPS | |
| * 6 |             TABLE ACCESS INMEMORY FULL | STORES |
| 7 |             PARTITION RANGE AND | |
| * 8 |               INDEX RANGE SCAN | S_STORE_ID |
| * 9 |         HASH JOIN | |
| * 10 |           TABLE ACCESS INMEMORY FULL | STORES |
| 11 |           PARTITION RANGE AND | |
| * 12 |             TABLE ACCESS INMEMORY FULL | SALES |

Predicate Information (identified by operation id):

4 - filter(TIME_ID < '09-01-2014' AND
    TIME_ID >= '01-01-2014')
6 - inmemory(TYPE='Outlet')
8 - access(SALES.STORE_ID = STORES.ID)
9 - access(SALES.STORE_ID = STORES.ID)
10 - inmemory(TYPE='Outlet')
12 - inmemory(TIME_ID >= '09-01-2014' AND
    TIME_ID < '12-31-2014')

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
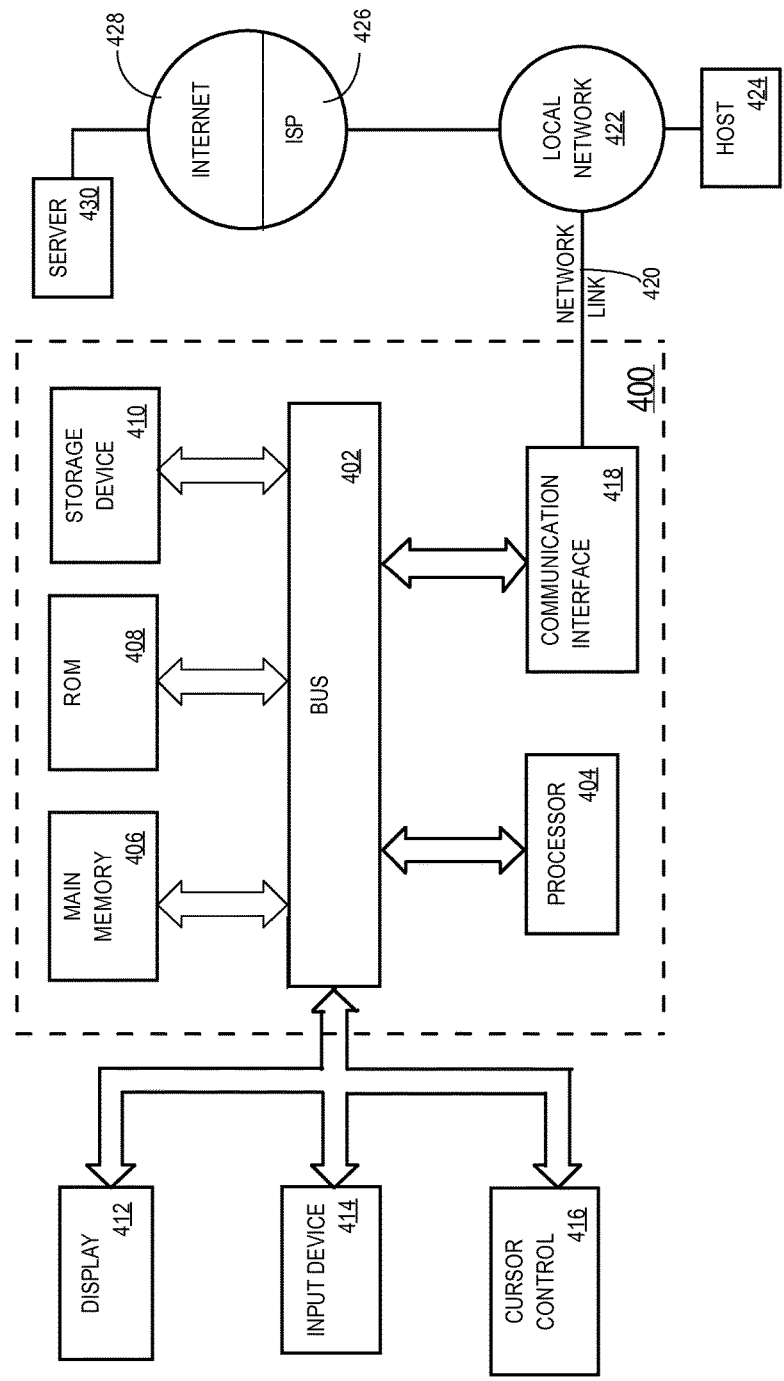
FIG. 4 is block diagram illustrating a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a database server, a query that requires performance of particular operations;
   wherein the particular operations include operations that access a particular set of data items;
   wherein copies of the data items of the particular set of data items reside in a particular row-major table on persistent storage;

wherein additional copies of at least a subset of the particular set of data items reside, in volatile memory, in one or more column-major in-memory compression-units;

evaluating a plurality of alternative execution plans for performance of the particular operations;

wherein the plurality of alternative execution plans includes at least:
- a first execution plan that performs a full table scan that accesses copies of data items in the one or more column-major in-memory compression-units;
- a second execution plan that does not perform a full table scan that accesses copies of data items in the one or more column-major in-memory compression-units;

for each execution plan of the plurality of alternative execution plans, determining a cost associated with the execution plan;

wherein determining the cost for the first execution plan includes at least one of:
- determining what fraction of the particular row-major table is duplicated in the one or more column-major in-memory compression units;
- determining how many column-major in-memory compression-units will need to be scanned, as part of the full table scan, after pruning non-matching column-major in-memory compression-units based on (a) filter predicates of the query, and (b) minimum and maximum values maintained for each column-major in-memory compression-unit;
- determining a decompression cost for decompressing those column-major in-memory compression-units to be used during performance of the full table scan;
- determining a row-stitching cost that represents overhead required to produce row-major results from data items extracted from column-major in-memory compression-units; or
- determining a journal-scan cost for scanning a journal, maintained in volatile memory, that contains updates for data items that have become invalid in the one or more column-major in-memory compression-units;

selecting a particular execution plan, of the plurality of alternative execution plans, based on the cost determined for the particular execution plan;

obtaining a result set for the query by executing the particular execution plan; and returning the result set of the query.

2. The method of claim 1 wherein the second execution plan performs a full table scan that does not access copies of data items in the one or more column-major in-memory compression-units.

3. The method of claim 1 wherein the second execution plan makes use of an index to perform the particular operations without performing any full table scan.

4. The method of claim 1 wherein determining the cost for the first execution plan includes determining what fraction of the particular row-major table is duplicated in the one or more column-major in-memory compression units.

5. The method of claim 1 wherein determining the cost for the first execution plan includes determining how many column-major in-memory compression-units will need to be scanned, as part of the full table scan, after pruning non-matching column-major in-memory compression-units based on (a) filter predicates of the query, and (b) minimum and maximum values maintained for each column-major in-memory compression-unit.

6. The method of claim 1 wherein determining the cost for the first execution plan includes determining a decompression cost for decompressing those column-major in-memory compression-units to be used during performance of the full table scan.

7. The method of claim 1 wherein determining the cost for the first execution plan includes determining a row-stitching cost that represents overhead required to produce row-major results from data items extracted from column-major in-memory compression-units.

8. The method of claim 1 wherein determining the cost for the first execution plan includes determining a journal-scan cost for scanning a journal, maintained in volatile memory, that contains updates for data items that have become invalid in the column-major in-memory compression-units.

9. The method of claim 1 wherein:
- the database server is executing on one node of a multi-node database cluster;
- the query specifies a join between that particular row-major table and a second row-major table;
- the join requires particular data items from the particular row-major table to be joined with particular data items from the second row-major table;
- copies of the particular data items from the particular row-major table are in a first column-major in-memory compression unit;
- copies of the particular data items from the second row-major table are in a second column-major in-memory compression unit; and
- determining the cost for the first execution plan further includes determining whether the first column-major in-memory compression unit is in the same node of the cluster as the second column-major in-memory compression unit.

10. A method comprising:

receiving, at a database server, a query that requires performance of particular operations;

wherein the particular operations include operations that access particular data items;

wherein copies of the particular data items reside in a particular row-major table on persistent storage;

wherein additional copies of at least a subset of the particular data items reside, in volatile memory, in one or more column-major in-memory compression-units;

splitting the query into:
- a first query that accesses portions of the particular table that are not duplicated in the one or more column-major in-memory compression units, and
- a second query that accesses portions of the particular table that are duplicated in the one or more column-major in-memory compression units;

evaluating a first plurality of alternative execution plans for the first query;

wherein evaluating the first plurality of alternative execution plans includes determining costs for each of the first plurality of alternative execution plans;

evaluating a second plurality of alternative execution plans for the second query;

wherein evaluating the second plurality of alternative execution plans includes determining costs for each of the second plurality of alternative execution plans;

selecting a first particular execution plan, of the first plurality of alternative execution plans, based on the cost determined for the first particular execution plan;

selecting a second particular execution plan, of the second plurality of alternative execution plans, based on the cost determined for the second particular execution plan;

obtaining a result set for the query by:
executing the first particular execution plan to produce a first result set, executing the second particular execution plan to produce a second result set, and combining the first result set and the second result set into a combined result set for the query; and returning the combined result set for the query.

11. The method of claim 10 wherein the first particular execution plan uses a different access path to obtain data items from the particular table than the second particular execution plan.

12. The method of claim 10, wherein the second plurality of alternative execution plans for the second query includes at least a first alternative execution plan that retrieves at least some data from a row-major table, and a second alternative execution plan that retrieves at least some data from a column-major in-memory compression unit.

13. One or more non-transitory computer-readable media storing instructions which, when executed by one or more processors, cause selection of execution plans for queries submitted to a dual-format database system by:

receiving, at a database server, a query that requires performance of particular operations;

wherein the particular operations include operations that access a particular set of data items;

wherein copies of the data items of the particular set of data items reside in a particular row-major table on persistent storage;

wherein additional copies of at least a subset of the particular set of data items reside, in volatile memory, in one or more column-major in-memory compression-units;

evaluating a plurality of alternative execution plans for performance of the particular operations;

wherein the plurality of alternative execution plans includes at least:
a first execution plan that performs a full table scan that accesses copies of data items in the one or more column-major in-memory compression-units;
a second execution plan that does not perform a full table scan that accesses copies of data items in the one or more column-major in-memory compression-units;

for each execution plan of the plurality of alternative execution plans, determining a cost associated with the execution plan;

wherein determining the cost for the first execution plan includes at least one of:
determining what fraction of the particular row-major table is duplicated in the one or more column-major in-memory compression units;
determining how many column-major in-memory compression-units will need to be scanned, as part of the full table scan, after pruning non-matching column-major in-memory compression-units based on (a) filter predicates of the query, and (b) minimum and maximum values maintained for each column-major in-memory compression-unit;
determining a decompression cost for decompressing those column-major in-memory compression-units to be used during performance of the full table scan;
determining a row-stitching cost that represents overhead required to produce row-major results from data items extracted from column-major in-memory compression-units; or
determining a journal-scan cost for scanning a journal, maintained in volatile memory, that contains updates for data items that have become invalid in the one or more column-major in-memory compression-units;

selecting a particular execution plan, of the plurality of alternative execution plans, based on the cost determined for the particular execution plan;

obtaining a result set for the query by executing the particular execution plan; and returning the result set of the query.

14. The one or more non-transitory computer-readable media of claim 13 wherein the second execution plan performs a full table scan that does not access copies of data items in the one or more column-major in-memory compression-units.

15. The one or more non-transitory computer-readable media of claim 13 wherein the second execution plan makes use of an index to perform the particular operations without performing any full table scan.

16. The one or more non-transitory computer-readable media of claim 13 wherein determining the cost for the first execution plan includes instructions for determining what fraction of the particular row-major table is duplicated in the one or more column-major in-memory compression units.

17. The one or more non-transitory computer-readable media of claim 13 wherein determining the cost for the first execution plan includes determining how many column-major in-memory compression-units will need to be scanned, as part of the full table scan, after pruning non-matching column-major in-memory compression-units based on (a) filter predicates of the query, and (b) minimum and maximum values maintained for each column-major in-memory compression-unit.

18. The one or more non-transitory computer-readable media of claim 13 wherein determining the cost for the first execution plan includes determining a decompression cost for decompressing those column-major in-memory compression-units to be used during performance of the full table scan.

19. The one or more non-transitory computer-readable media of claim 13 wherein determining the cost for the first execution plan includes determining a row-stitching cost that represents overhead required to produce row-major results from data items extracted from column-major in-memory compression-units.

20. The one or more non-transitory computer-readable media of claim 13 wherein determining the cost for the first execution plan includes determining a journal-scan cost for scanning a journal, maintained in volatile memory, that contains updates for data items that have become invalid in the column-major in-memory compression-units.

21. The one or more non-transitory computer-readable media of claim 13 wherein:
the database server is executing on one node of a multi-node database cluster;
the query specifies a join between that particular row-major table and a second row-major table;
the join requires particular data items from the particular row-major table to be joined with particular data items from the second row-major table;
copies of the particular data items from the particular row-major table are in a first column-major in-memory compression unit;

copies of the particular data items from the second row-major table are in a second column-major in-memory compression unit; and determining the cost for the first execution plan further includes determining whether the first column-major in-memory compression unit is in the same node of the cluster as the second column-major in-memory compression unit.

22. One or more non-transitory computer-readable media storing instructions which, when executed by one or more processors, cause:

receiving, at a database server, a query that requires performance of particular operations;

wherein the particular operations include operations that access particular data items;

wherein copies of the particular data items reside in a particular row-major table on persistent storage;

wherein additional copies of at least a subset of the particular data items reside, in volatile memory, in one or more column-major in-memory compression-units;

splitting the query into:
    a first query that accesses portions of the particular table that are not duplicated in the one or more column-major in-memory compression units, and
    a second query that accesses portions of the particular table that are duplicated in the one or more column-major in-memory compression units;

evaluating a first plurality of alternative execution plans for the first query;

wherein evaluating the first plurality of alternative execution plans includes determining costs for each of the first plurality of alternative execution plans;

evaluating a second plurality of alternative execution plans for the second query;

wherein evaluating the second plurality of alternative execution plans includes determining costs for each of the second plurality of alternative execution plans;

selecting a first particular execution plan, of the first plurality of alternative execution plans, based on the cost determined for the first particular execution plan;

selecting a second particular execution plan, of the second plurality of alternative execution plans, based on the cost determined for the second particular execution plan;

obtaining a result set for the query by:
    executing the first particular execution plan to produce a first result set,
    executing the second particular execution plan to produce a second result set, and
    combining the first result set and the second result set into a combined result set for the query; and returning the combined result set for the query.

23. The one or more non-transitory computer-readable media of claim 22 wherein the first particular execution plan uses a different access path to obtain data items from the particular table than the second particular execution plan.

24. The one or more non-transitory computer-readable media of claim 22, wherein the second plurality of alternative execution plans for the second query includes at least a first alternative execution plan that retrieves at least some data from a row-major table, and a second alternative execution plan that retrieves at least some data from a column-major in-memory compression unit.

* * * * *

UNITED STATES PATENT AND TRADEMARK OFFICE
CERTIFICATE OF CORRECTION

PATENT NO. : 10,073,885 B2
APPLICATION NO. : 14/806597
DATED : September 11, 2018
INVENTOR(S) : Das et al.

Page 1 of 1

It is certified that error appears in the above-identified patent and that said Letters Patent is hereby corrected as shown below:

In the Specification

In Column 2, Line 17, after "compression-unit;" delete "and".

In Column 2, Lines 19-20, delete "implemented." and insert -- implemented; and --, therefor.

In Column 7, Line 45, after "column" insert -- . --.

In Column 11, Line 26, after "pruning" insert -- . --.

In the Claims

In Column 22, Line 26, in Claim 16, after "includes" delete "instructions for".

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*